UNITED STATES PATENT OFFICE.

ALVAH H. SABIN, OF BURLINGTON, VERMONT, ASSIGNOR TO HIMSELF, GEORGE H. MORSE, WILLIAM A. CROMBIE, OTIS SHEPARD, EDWARD W. PECK, AND T. S. PECK, ALL OF SAME PLACE.

PROCESS OF MAKING LACTOSE OR MILK-SUGAR.

SPECIFICATION forming part of Letters Patent No. 307,594, dated November 4, 1884.

Application filed September 4, 1884. (No specimens.)

*To all whom it may concern:*

Be it known that I, ALVAH H. SABIN, of Burlington, in the State of Vermont, have invented a certain new and useful Process of Making Lactose or Milk-Sugar, of which the following is a specification.

The object of my invention is to utilize whey for the manufacture of milk-sugar. Whey may, in general terms, be defined as a watery solution of milk-sugar and some highly-soluble nitrogenous matter. To obtain the sugar it is necessary to remove as completely as possible the nitrogenous matter referred to and to evaporate the water. To this end I have devised the process which will now be described. The whey used should, to begin with, be as free as possible from butter and nitrogenous matters. I prefer the whey produced in practicing the process set forth in Letters Patent No. 275,263, dated April 3, 1883; but other kinds of whey can be availed of also. The first step is to partially free the whey from matters other than milk-sugar, which is effected by boiling it or heating it to a temperature above 200° Fahrenheit, in order to precipitate these matters. In some cases it is necessary to aid the precipitation by adding chemicals. What I now prefer is a mixture of nitrate of potash, carbonate of soda, and carbonate of lime, which may be added in quantities as follows: lime carbonate, not exceeding one-tenth of one per cent. of the weight of the whey; nitrate of potash, carbonate of soda, each not exceeding one hundredth of one per cent. of the weight of the whey. The quantities used will necessarily vary with the quality of the whey. I then separate the precipitated matters from the liquid by filtration, using for the purpose any suitable filter. I now prefer one of cloth. The whey thus purified and filtered is then evaporated in any suitable evaporating-pan heated by a water bath or steam-jacket.

In practice I carry on the evaporating operation until a bulky white precipitate appears, at which point the evaporating operation is suspended, the liquid is refiltered so as to remove this precipitate, and then the evaporating operation is resumed as before until nearly to dryness. The precipitate appearing during the evaporating operation is similar, apparently, to that thrown down by the boiling operation, and when by the second filtration it is removed the whey is left in very pure condition.

Heretofore in obtaining milk-sugar from whey the whey has been boiled until of a sirupy consistency, and has then been put into other vessels and the sugar allowed to crystallize. This method is expensive and results in an inferior product. By my process the evaporating operation is carried on until the sugar crystallizes in the evaporating-pan, and indeed until nearly all the liquid is expelled. When this point is reached, the crystallized milk-sugar, now in the crude state, is removed from the pan and cooled, after which it is washed thoroughly in a limited quantity of cold water in order to remove from it any remaining impurities. The crude sugar after the evaporating operation is in large masses or lumps, and in this shape it cannot well be cleansed of impurities. I have found, however, that by first breaking up or crushing the lumps so as to reduce the mass to a very coarse powder, like coarsely-ground coffee, I can then, by washing the same in cold water, most effectively and thoroughly remove the organic impurities. At first sight it would seem that if the crystals be broken up or very small there would be loss in washing; but in practice this is not the case. The loss is very little, and is more than counterbalanced by the advantages gained.

The manner in which I am accustomed to perform the washing operation is to pass the wet crude sugar through a mill similar to a large coffee-mill, and to run through the mill at the same time a small stream of ice-water. The mill reduces the sugar to a very coarse powder, like grits or coarsely-ground coffee, and the ice-water which passes through the mill with the sugar removes all the impurities and leaves it nearly white in color. By this series of operations I obtain a sugar which is practically pure, and can without further preparation be dried and reduced to the powdered form in which it is sold in the market.

What I claim as new and of my own invention is as follows:

1. The described process of obtaining milk-sugar from whey, consisting in preliminarily purifying the whey by boiling or heating and then filtering it, subsequently evaporating the filtered liquid nearly to dryness, and then cooling and washing the crude crystallized sugar resulting from the evaporating operation, as and for the purposes hereinbefore set forth.

2. The method of removing impurities from the crude milk-sugar, consisting in reducing the sugar to a coarse powder, and washing the same with cold water during or subsequently to the reducing operation, as and for the purposes hereinbefore set forth.

In testimony whereof I have hereunto set my hand this 2d day of September, 1884.

ALVAH H. SABIN.

Witnesses:
H. E. TUTHERLY,
T. S. PECK.